(12) United States Patent
Mendonsa et al.

(10) Patent No.: US 10,776,010 B1
(45) Date of Patent: Sep. 15, 2020

(54) ACCESS SCHEMES FOR DRIVE-SPECIFIC READ/WRITE PARAMETERS

(71) Applicant: Seagate Technology LLC, Cupertino, CA (US)

(72) Inventors: Riyan Alex Mendonsa, Minneapolis, MN (US); Jon D Trantham, Chanhassen, MN (US); Anil J Reddy, Minneapolis, MN (US); Varun Reddy Boddu, Singapore (SG); Ajay Narayan Kulkarni, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/389,791

(22) Filed: Apr. 19, 2019

(51) Int. Cl.
| | |
|---|---|
| *G06F 21/62* | (2013.01) |
| *G11B 17/041* | (2006.01) |
| *G06F 3/06* | (2006.01) |
| *G11B 5/60* | (2006.01) |

(52) U.S. Cl.
CPC ............ *G06F 3/0604* (2013.01); *G06F 3/068* (2013.01); *G06F 3/0634* (2013.01); *G06F 3/0658* (2013.01); *G11B 5/607* (2013.01)

(58) Field of Classification Search
CPC .. G11B 5/00; G11B 5/09; G11B 27/36; G11B 17/041; G06F 3/0604; G06F 3/0605; G06F 21/62; G06F 12/0868; G06F 2217/7208; G06F 2212/202; G06F 17/30174; G05F 21/6227
USPC ........... 360/99.14, 99.13; 713/193, 184, 173, 713/167
See application file for complete search history.

(56) References Cited

U.S. PATENT DOCUMENTS 7,162,645 B2 *   1/2007   Iguchi ..................... G06F 21/10
                                                        713/167

OTHER PUBLICATIONS

U.S. Appl. No. 16/358,255, filed Mar. 19, 2019, Seagate Technology LLC.
U.S. Appl. No. 16/284,687, filed Feb. 25, 2019, Seagate Technology LLC.

* cited by examiner

*Primary Examiner* — Nabil Z Hindi
(74) *Attorney, Agent, or Firm* — Holzer Patel Drennan

(57) ABSTRACT

A system includes a read/write controller removably coupled to a storage drive. Responsive to detection of a coupling between the read/write controller and the storage drive, the read/write controller retrieves key information from the storage drive, uses the key information to locate adaptives associated with the primary storage medium, and loads the adaptives into volatile memory to configure read/write settings for access to the primary storage medium.

20 Claims, 5 Drawing Sheets

ACCESS SCHEMES FOR DRIVE-SPECIFIC READ/WRITE PARAMETERS

SUMMARY

A method disclosed herein includes detecting a new coupling to a storage drive including a primary storage medium; retrieving key information from the storage drive responsive to the detection; and using the key information to locate and load the adaptives into working memory to configure the system controller for access to the primary storage medium.

A system disclosed herein includes a read/write controller removably coupled to a storage drive including a primary storage medium. The read/write controller is configured to retrieve key information from the storage drive responsive to detection of a coupling to the storage drive; use the key information to locate adaptives associated with the primary storage medium; and load the adaptives into working memory to configure settings (e.g., read/write settings and security settings) for access to the primary storage medium.

A computer readable memory device disclosed herein encodes instructions for executing a computer process comprising: detecting a coupling between a read/write controller and a storage drive including a primary storage medium and reading adaptives for the primary storage medium from a first zone of the primary storage medium responsive to detection of the coupling, the adaptives being stored at a lower linear density than other data in the first zone.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTIONS

Figure 1:
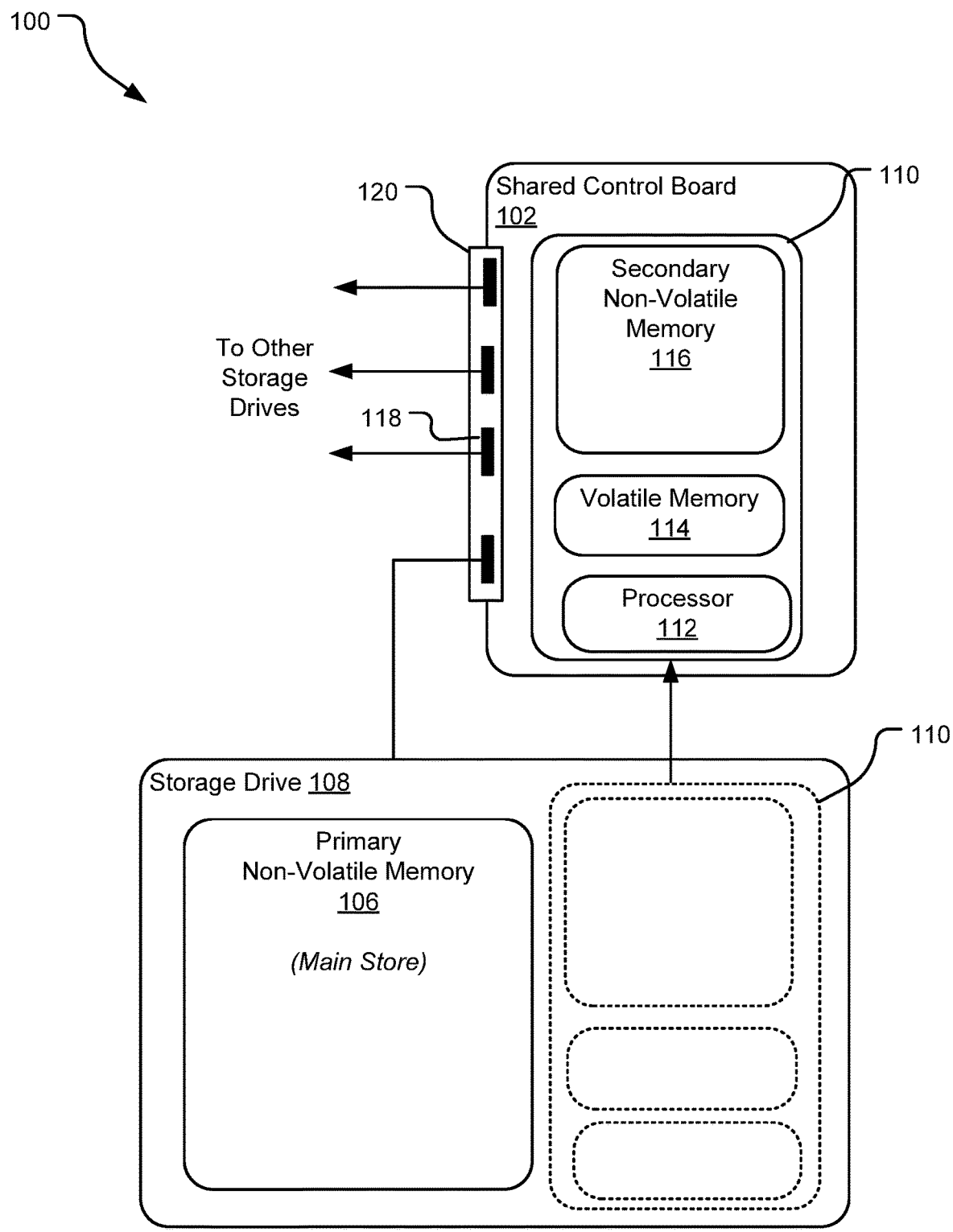
FIG. 1 illustrates an exemplary storage system including a storage drive that lacks traditional storage and processing resources for storing and loading adaptives utilized to access a primary non-volatile storage memory within an enclosure of the storage drive.

Prior to reading and writing data to a storage medium, a device storage controller typically loads a set of drive-specific parameters, referred to herein as "adaptives," into working memory (e.g., volatile memory). These adaptives are, for example, factory-determined read/write settings for configuring a read/write controller to read data from or write data to a particular storage medium with an error rate within an acceptable predefined margin. As used herein, "adaptives" refer to drive-specific parameters used in data access operations that may differ from one storage medium to another and/or from one storage device to another, even when those storage devices and/or storage media have identical technical specifications (e.g., type, capacity).

Adaptives are utilized in several different types of storage devices. One adaptive parameter in hard drive devices (HDDs) is fly height and—more specifically, the variables utilized by the drive to compute a transfer function that relates heater power to the storage device's fly height, allowing the storage device to precisely control the height at which its read/write elements hover above the media when reading and writing data. In contrast, adaptives stored by a solid state device (SSD) may include the precise voltage levels needed to accurately program different levels within each multi-level cell (MLC). In tape drives, adaptives that may be stored on a tape include identifiers regarding what family of tape the tape belongs to, usage statistics, etc.

Additional examples of adaptives include, without limitation, the tracks per inch (TPI) of a disk, a track identifier of the first track that a read/write head may "see" when leaving a loading ramp, head-specific channel parameters, bad sectors/cells, available storage capacity, parameters identifying a type of data management implement (e.g., shingled magnetic recording, interlaced magnetic recording, conventional magnetic recording), laser parameters in drives that utilize heat-assisted magnetic recording (HAMR), microwave parameters in drives that utilize microwave-assisted magnetic recording (MAMR), location of faulty sectors or media defects, etc.

In many cases, adaptives are determined during initial factory calibrations of a storage device. Traditionally, adaptives used for accessing a storage device's primary storage medium are stored in a secondary storage medium of the storage device. For example, some older hard drive devices (HDDs) store adaptives in local EPROM, while newer HDDs may store adaptives in Flash on a printed circuit board assembly (PCBA) of the storage device. In contrast, solid state devices (SSDs) typically store adaptives for accessing a primary storage medium on a separate secondary storage medium (e.g., a system memory zone) managed by the SSD controller.

The growing use of cloud-based storage solutions has driven demand for low-cost data storage systems capable of retaining large volumes of data. In recent years, this demand has driven development of storage solutions with read/write control circuitry shared between groups of hot-swappable drives. In these systems, some or all of the read/write control electronics traditionally included within each individual drive may be displaced from the drive's enclosure to a shared control board with an interconnect that couples the read/write control electronics to several different drives. These read/write control electronics located on the shared control board may generate the read/write control signals to control data access to each of multiple drives concurrently coupled to the control board. In at least some implementations, the generated read/write control signals are analog.

Some of these systems with centralized, shared read/write controls include drive enclosures designed to removably couple to a shared control board for individual drive replacement and servicing. These drives may individually lack memory and secondary storage traditionally used to store, access, and load adaptives. When these types of resources are displaced from individual drive enclosures to locations shared by multiple drives, challenges arise relating to how and where these adaptives are stored and accessed.

FIG. 1 illustrates an exemplary storage system 100 including a storage drive 108 that lacks traditional storage and processing resources for storing and loading adaptives utilized to access (read data from or write data to) a primary non-volatile memory 106 within an enclosure of the storage drive 108. The primary non-volatile memory 106 may include one or more types of non-volatile storage media including, for example, magnetic disks, optical drives, flash, etc. Data blocks within the primary non-volatile storage memory 106 collectively comprise a "main store," which refers to a collection of physical data blocks mapped to a range of logical block addresses (LBAs) utilized by a host device when reading and writing data to the data storage device.

The storage drive 108 is coupled to a shared control board 102 that includes read/write control electronics 110 for generating the read and write signals to access the primary non-volatile memory 106 as well as the read and write signals for accessing primary non-volatile memory within other drives that are also coupled to the shared control board 102 through various ports (e.g., a port 118) in an interconnect 120.

Although the specific read/write control electronics 110 included on the shared control board 102 may vary from one implementation to another, the read/write control electronics of FIG. 1 include at least a processor 112, volatile memory 114 (e.g., DRAM), and a secondary non-volatile memory 116 (e.g., Flash). As indicated by dotted lines within the storage drive 108, the read/write control electronics 110 represent a collection of electronics traditionally included within an enclosure of the storage drive 108 that have, in FIG. 1, been displaced to the shared control board 102.

When the read/write control electronics 110 recognize a coupling to a new (unidentified) storage drive, the primary non-volatile memory 106 of that drive may not be accessible until the corresponding (e.g., drive-specific) adaptives are identified, loaded into the volatile memory 114, and used to pre-configure read/write settings for the data access operation to the primary non-volatile memory 106. In an implementation where the storage drive 108 is permanently coupled to the shared control board 102, these adaptives may be stored in the secondary non-volatile memory 116, such as in association with an identifier for the storage drive 108. However, this scenario is complicated if the storage drive 108 is designed to removably couple to the shared control board 102. In this case, the read/write control electronics 110 may, at any time, identify a coupling to a new drive (e.g., one of millions of drives in market circulation). Accordingly, the read/write control electronics 110 needs a way to locate and load the adaptives for the new drive even if the drive has never previously been coupled to the shared control board 102.

The herein disclosed technology provides a number of solutions to this challenge. In one implementation, the storage drive 108 stores a unique self-identifier. For example, the storage drive may include an NFC chip, an RFID tag, or a barcode that is readable by the shared control board. Upon retrieving a small (e.g., less than 10 kB) identifier from the storage drive 108, the read/write control electronics 110 access an external (e.g. cloud-hosted) library storing a sets of adaptives that are each associated with a different self-identifying code permanently stored on a different storage drive in market circulation.

In yet still another implementation, the read/write control electronics 110 retrieve a subset of critical adaptives (e.g., the most important adaptives for data access) from a small memory chip or tag on the storage drive 108. Using this information, the read/write control electronics 110 configure the storage drive 108 to read the remaining adaptives from the primary storage memory 110 or an alternate storage medium. In yet still another implementation, the read/write control electronics 110 are programmed to recover the adaptives from the primary non-volatile memory 106 without first recovering any adaptives from a secondary memory source. For example, the adaptives may be stored at a linear bit density (bits per inch (BPI)) and/or track density (tracks per inch (TPI)) that is so low that the corresponding data may be read from the such regions when the device is operating in a "passive fly height mode"—a mode where the heaters on a read/write head are not turned on—without first loading any of the drive's adaptives into the volatile memory 114. These and other implementations are explored in detail with respect to the following figures.

Figure 2:
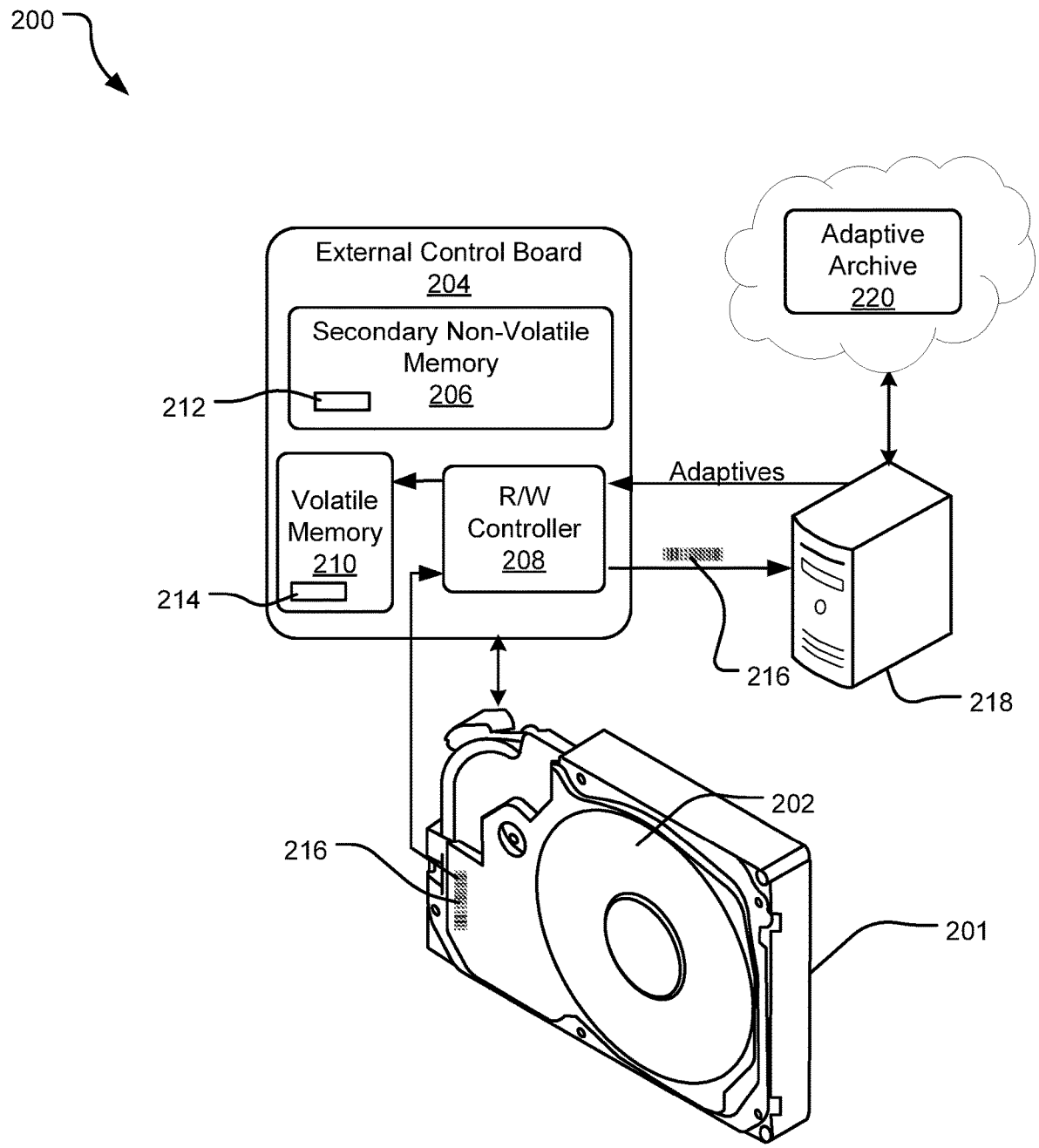
FIG. 2 illustrates an example storage drive that lacks traditional storage and processing resources for storing and loading adaptives that configure the storage drive for access to a primary storage medium.

FIG. 2 illustrates an example system 200 including a storage drive 201 that lacks traditional storage and processing resources for storing and loading adaptives usable to configure the storage drive 201 for access to a primary storage medium. By example and without limitation, the primary storage medium 202 of the storage drive 201 is a magnetic disk. In other implementations, the primary storage medium 202 of the storage drive 201 is a solid state drive (SSD). In still other implementations, the primary storage medium 202 is a tape storage drive.

In FIG. 2, several components traditionally included within a storage drive's enclosure have been displaced to an external control board 204 including a read/write controller 208, volatile memory 210, and a non-volatile memory 206 (e.g., Flash). The read/write controller 208 includes control electronics (e.g., hardware and software) for generating control signals effective to read data from and write data to the primary storage medium 202 of the storage drive 201 as well as to the primary storage media of one or more other storage drives (not shown) that are also communicatively coupled to the external control board 204 In at least one implementation, the storage drive 201 does not have an internal processor that generates read/write signals. For example, the read/write controller 208 on the external control board 204 includes the primary system on chip (SOC) that is used when reading and writing data to the primary storage medium 202.

The non-volatile memory 206 of the external control board 204 stores firmware commands 212 executed by the read/write controller 208 when reading and writing data to the storage drive. However, successful execution of such commands (e.g., within acceptable error margins) depends on capability of the read/write controller 208 to first ascertain the drive's adaptives and load read/write settings 214 into volatile memory 210 that are based on the adaptives.

When the external control board 204 detects a new coupling to the storage drive 201, the read/write controller 208 executes a firmware command 212 to retrieve key information from the storage drive 201 that is usable by the read/write controller 208 and/or an external host to identify a storage position of the drive's associated adaptives. As used herein, a "new coupling" may refer to a new physical coupling between a drive and the read/write controller 208 or, alternatively, to a power-on sequence of a drive, such as a power-on sequence that occurs responsive to a new physical drive coupling or a drive reboot.

In one implementation, the read/write controller 208 retrieves a unique identifier 216 that is stored on or within an enclosure of the storage drive 201 at a location external to the primary storage medium 202. For example, the unique identifier 216 may be bar code scannable by a bar code reader on the external control board 204. In another implementation, the unique identifier 216 is included within an RFID tag or smart label readable by an RFID reader located on the external control board 204. In yet still another implementation, the unique identifier is included within an NFC tag readable by an NFC reader located on the external control board 204. In still other implementations, the storage drive 201 includes a small flash chip that stores the drive's unique identifier 216. In yet still other implementations, the storage drive 201 includes a preamp chip with a unique identifier that is used as the drive's unique identifier. The read/write controller 208 transmits the unique identifier 216 to a host 218 which may, in some cases, further communicate the unique identifier 216 to an external server via an internet connection.

The host 218 (or in some cases, the external server in communication with the 1 host 218) queries a local or web-based database (e.g., adaptive archive 220) with the unique identifier 216 and the database answers the query with a set of adaptives stored in the database in association with the unique identifier 216. The host 218 transmits the retrieved adaptives back to the read/write controller 208 on the external control board 204 and the read/write controller 208, in turn, loads the volatile memory 210 with the adaptives and/or with read/write settings 214 based on the retrieved adaptives.

In one implementation, the read/write controller 208 stores the retrieved adaptives in the non-volatile memory 206 of the external control board 204 so that the adaptives may be optionally loaded into the volatile memory 210 at any time while the storage drive 201 remains coupled to the external control board 204. When the storage drive 201 is decoupled from the external control board 204, the storage blocks storing the associated set of adaptives within the non-volatile memory 206 of the external control board 204 may be freed up for overwrite.

Once the volatile memory 210 is loaded with read/write settings 214 for the storage drive 201 that are configured based on the retrieved adaptives, the read/write controller 208 may begin to execute read/write commands targeting the storage drive 201.

Figure 3:
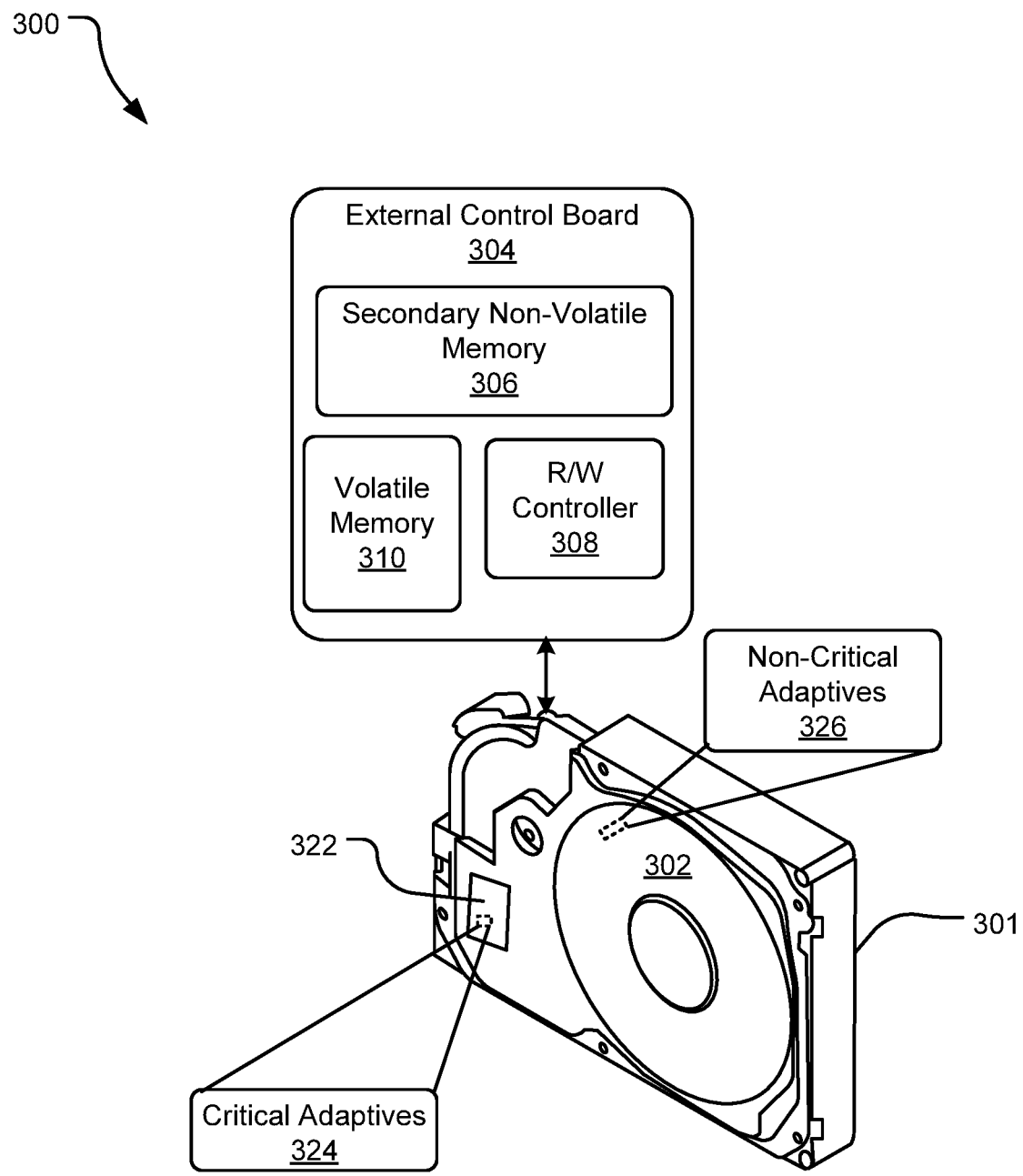
FIG. 3 illustrates another example storage drive that lacks traditional storage and processing resources for storing and loading adaptives that configure the storage drive for access to a primary storage medium.

FIG. 3 illustrates another example system 300 with a storage drive 301 that lacks traditional storage and processing resources for storing and loading adaptives to configure the storage drive 301 for read and write access to its primary storage medium 302. In addition to the primary storage medium 302, the storage drive 301 includes a small, secondary storage medium 322 which may be, for example, a flash chip or RFID tag. In one example implementation, the secondary storage medium 322 is a Flash chip of less than a 1 KB of capacity. The secondary storage medium 322 is configured to store a subset of the most critical adaptives for the primary storage medium 302. As used herein, the term "critical adaptives" (e.g., critical adaptives 324) refers to a subset of adaptives for the storage drive 301 that are alone sufficient to configure read/write settings for a read of remaining (e.g., non-critical adaptives 326) from a location on the primary storage medium 302 within a predefined, acceptable error margin.

The storage drive 301 is coupled to an external control board 304 that includes at least a read/write controller 308, volatile memory 310, and a secondary non-volatile memory 306 (e.g., Flash). When the external control board 304 detects a new coupling to the storage drive 301 or a power-on sequence of the storage drive 301, the read/write controller 308 executes a firmware command 312 to retrieve key information from the secondary storage medium 322. According to one implementation, this key information includes a subset of the drive's adaptives (e.g., the critical adaptives 324) that allow the read/write controller 308 to retrieve remaining (e.g., non-critical adaptives 326) adaptives from a different storage medium, such as a location on the primary storage medium 302.

For example, the read/write controller 308 may be configured to read critical adaptives 324 from the secondary storage medium 322, load the critical adaptives 324 into the volatile memory 310, and execute a read operation according to read settings based on the critical adaptives 324 to retrieve a second subset of the drive's adaptives (e.g., the non-critical adaptives 326) from a location on the primary storage medium 302.

In one implementation where the primary storage medium 302 is a magnetic disk, the critical adaptives stored on the secondary storage medium 322 include fly height (e.g., variables utilized to compute a transfer function between a heater and corresponding fly height) and/or servo information that is sufficient to allow the read/write controller 308 to seek an actuator arm of the storage drive 301 to a storage position of the non-critical adaptives for the storage drive 301. In one implementation, the critical adaptives 324 additionally include a track ID of the first track that the read element "sees" when moving off the ramp, eccentricity of each encoded track, and corrections for repeatable run-out.

In the above example, the non-critical adaptives may include, for example, adaptives utilized in mitigating noise within read and write channels, adaptives identifying faulty sectors and defect locations, the available drive capacity, drive health information, and modified fly height parameters (e.g., parameters that have been re-calibrated during the life of the drive to improve upon default fly height parameters determined during initial drive calibration). After retrieving the critical adaptives 324 from the secondary storage medium 322 and configuring read/write settings of the read/write controller 308 according to the critical adaptives 324, the read/write controller reads the non-critical adaptives 326 from the primary storage medium 302. For example, the storage location of the non-critical adaptives 326 may be a default location (e.g., defined in firmware stored on the external control board 304) or, alternatively, a location that is specified by data stored along with the critical adaptives 324 in the secondary storage medium 322. After reading the non-critical adaptives 326 and configuring remaining read/write settings according to such adaptives, the read/write controller 308 is ready to execute host-initiated data access operations to read and write user data to the primary storage medium 302.

Aspects of the storage drive 301 and/or the external control board 304 not specifically described herein may be the same or similar to like-named components described with respect to FIG. 2.

Figure 4:
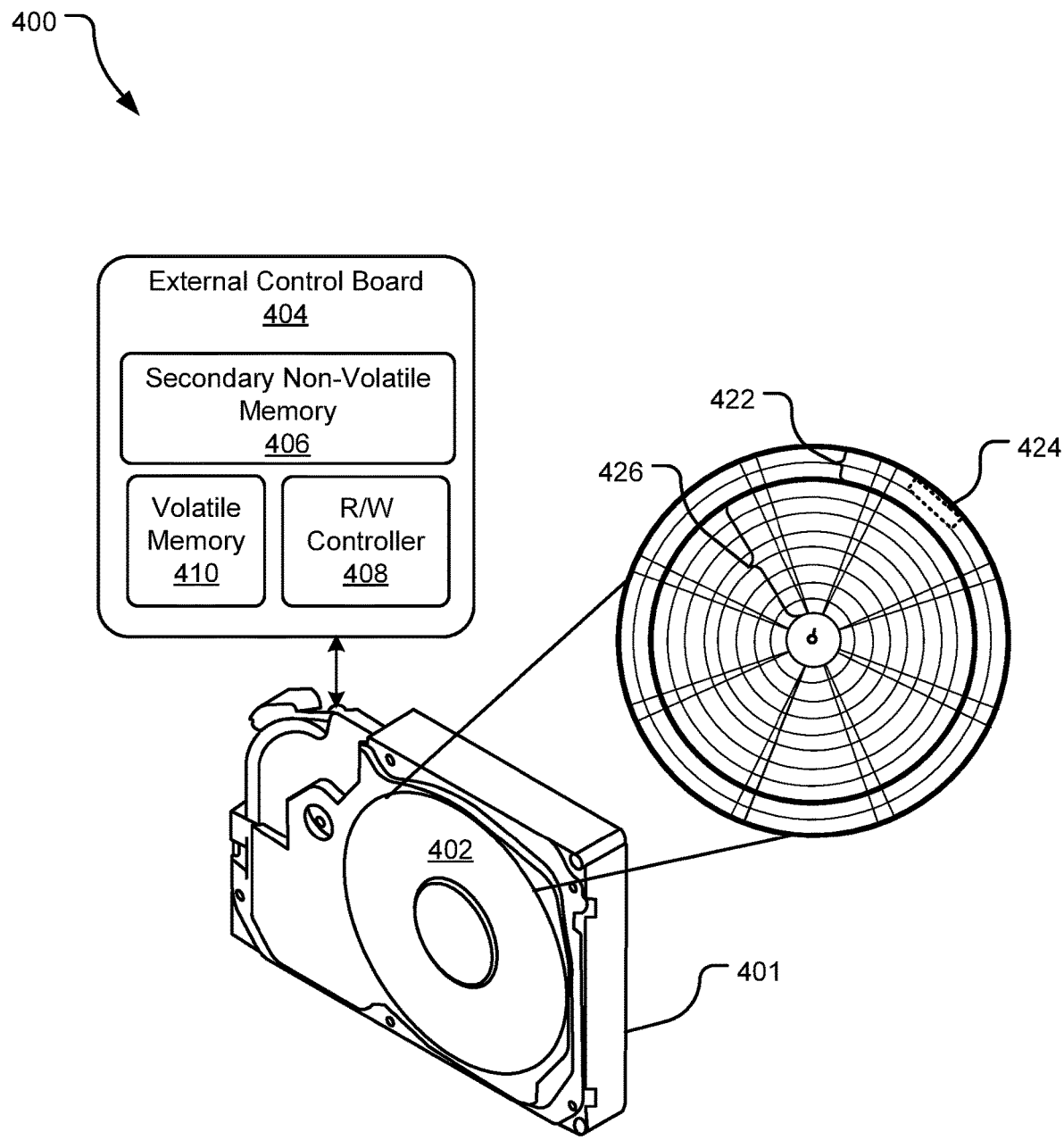
FIG. 4 illustrates yet another example storage drive that lacks traditional storage and processing resources for storing and loading adaptives to configure the storage drive for access to a primary storage media.

FIG. 4 illustrates another system 400 with an example storage drive 401 that lacks traditional storage and processing resources for storing and loading adaptives used to configure a read/write controller 408 to access to a primary storage media 402 of the storage drive 401. According to one implementation, some or all read/write control electronics of the storage drive 401 are located on external control board 404, which may be shared between multiple storage drives concurrently coupled to the external control board. By example and without limitation, the external control board 404 of FIG. 4 is shown to include the read/write controller 408, secondary non-volatile memory 406, and volatile memory 410.

In FIG. 4, the adaptives used to configure read/write settings for access to the disks within the primary storage media 402 are stored on one of the disks of the primary storage media 402. Typically, the read/write controller 408 is not able to read data from the disk when operating in a passive fly height mode without experiencing errors in excess of those correctable by the device's error correction code (ECC). According to one implementation of the disclosed technology, however, the adaptives for the primary storage media 402 are stored in a low-density zone 424 at such a low bit density (BPI) and/or track density (TPI) that they are readable without experiencing read errors in excess of the maximum number of errors that may are correctable by the ECC of the storage drive 401. Notably, in HAMR drives, high TPI can be achieved by increasing laser power that is used to locally heat the storage medium during recording.

As used herein, "passive fly height" mode refers to a mode of the storage drive 401 where heaters used for controlling fly height of read/write elements remain disabled. When the storage drive 401 reads data in a passive fly height mode, localized heating is not used to protrude read/write elements on the head toward the disk by any degree and fine position control of the head is therefore not available.

In one implementation, the storage drive 401 stores user data in a main store 426 on the primary storage medium and system data in a system zone 422. Adaptives utilized when performing reads and writes to these zones are stored in the low-density zone 424.

In one implementation, data stored in the low-density zone 424 is stored at a linear density that is lower than the linear density of the data that in both the main store 426 and the system zone 422. Consequently, the adaptives stored in this zone can be read while the device is operating in the passive fly height mode without generating errors in excess of those correctable by the ECC employed.

In one implementation, some data stored in the system zone 422 is stored at a lower linear and/or track density (BPI or TPI) than data in the main store 426; however, the system zone 422 is not readable in the passive fly-height mode (e.g., read errors exceed a correctable number).

In one implementation, the low-density zone 424 is a single contiguous storage region (e.g., as shown); in another implementation, the low-density zone 424 is distributed across two or more non-contiguous regions on the primary storage media 402. In one implementation, the low-density zone 424 is split or duplicated across multiple different storage media (e.g., three magnetic disks) of the storage drive 401. In another implementation, adaptives for the storage drive 401 are redundantly stored in a low-density zone on each of multiple disks within the storage drive 401.

By example and without limitation, the low-density zone 424 is shown to be internal to the system zone 4201. In some devices, the system zone 422 is subjected to certain write protections to prevent overwrite of critical system data managed by the read/write controller 408. Therefore, this zone may be an ideal storage solution for adaptives that remain unchanged throughout the device's lifetime. Adaptives that are periodically updated may, in contrast, be stored in a different region of disk storage that is not subjected to the heightened write protections of the system zone 422.

Figure 5:
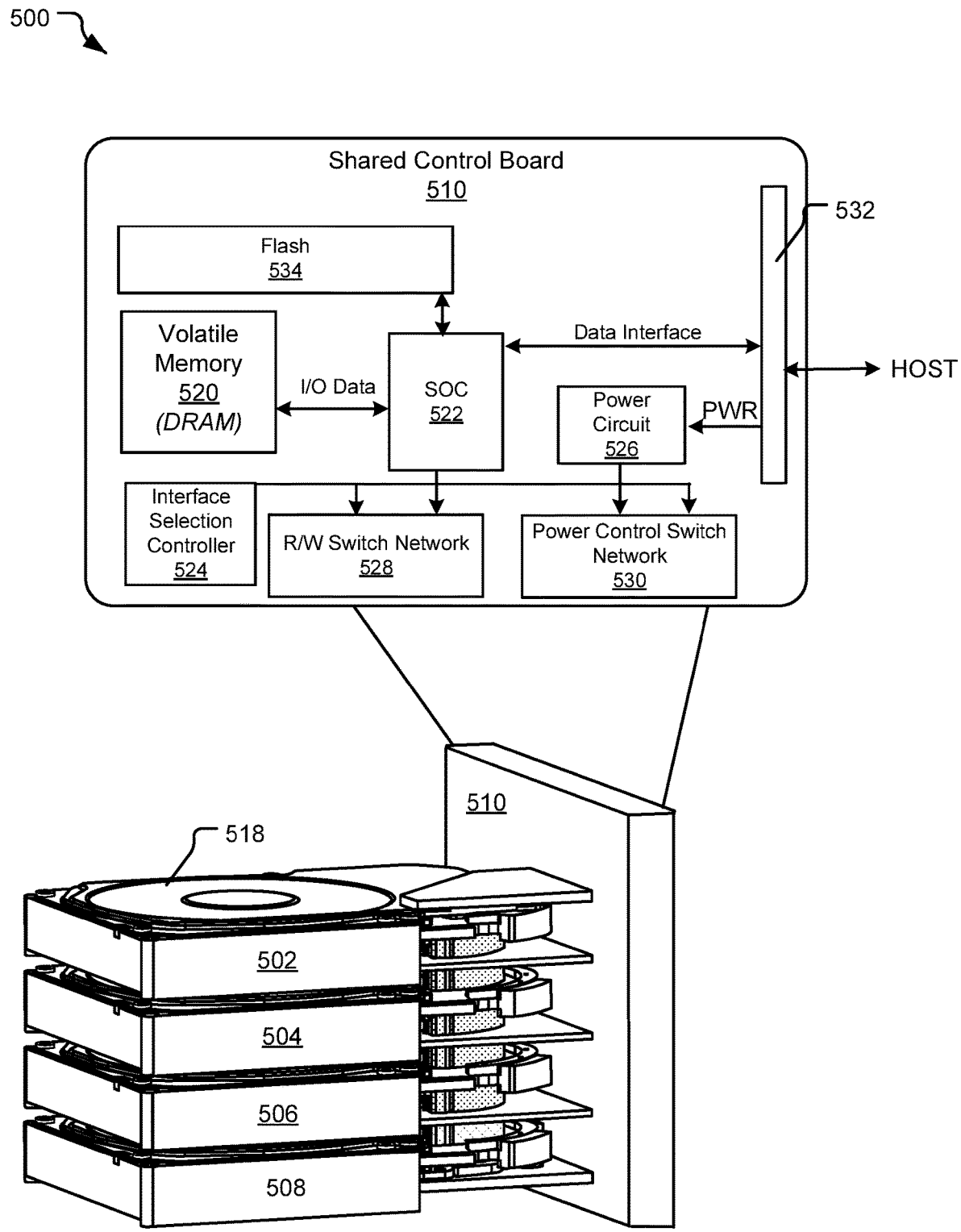
FIG. 5 illustrates another example storage system including multiple storage drives that implement the disclosed technology and removably couple to a shared control board.

FIG. 5 illustrates another example storage system 500 including multiple storage drives 502, 504, 506, 508 that implement the disclosed technology and removably couple to a shared control board 510. Like other implementations disclosed herein, the multiple storage drives 502, 504, 506, and 508 lack traditional internal storage and processing resources for storing and loading adaptives specific to each drive. Each of the multiple storage drives 502, 504, 506, and 510 includes one or more disks (e.g., a disk 518) and one or more actuators (not shown) that performs radial seeks across a corresponding disk surface to position read/write elements on a head to access the disk surface.

The shared control board 510 includes read/write and power circuitry for executing data access operations on each of the coupled storage drives 502, 504, 506, and 508. By example and without limitation, the shared control board 510 includes a system on chip (SOC) control circuit 522, memory (DRAM) 520, power control circuitry (power circuit) 526, and flash memory 534.

The SOC control circuit 522 includes a programmable processing core that utilizes firmware stored in the flash memory 534 to provide top level control for the multiple storage drives 502 504, 506, 508.

Responsive to detection of a new coupling between the shared control board 510 and a storage drive (e.g., one of the storage drives 502, 504, 506, and 508), the SOC 522 executes firmware instructions for retrieving adaptives for the storage drive and loading those adaptives into the volatile memory 520. These adaptives may, for example, be accessed and retrieved according to any of the solutions discussed above with respect to FIGS. 1-4. For example, the SOC 522 may retrieve an identifier from the newly-coupled storage device and include the identifier in a database request for the associated adaptives (e.g., a request to an external, web-based database). In other implementations, critical adaptives are stored on a small secondary memory internal to each of the storage drives (e.g., a flash chip, RFID tag, NFC tag), and these critical adaptives are used to configure the SOC 522 to read remaining adaptives from the disk(s) associated with the critical adaptives. In yet another implementation, adaptives for accessing a disk are stored on the disk at a linear and/or bit density that is low enough to permit a reading of such adaptives while the storage drive operates in a passive fly height mode. In one implementation the retrieval and loading of adaptives is performed responsive to a power-on sequence of a storage drive (e.g., a power sequence that initiates responsive to coupling to a new drive to the shared control board).

The shared control board 510 further incorporates a separate interface control circuit—interface selection processor 524—that utilizes internal programming to act as a switch controller to selectively control switches of a R/W switch network 528 to connect various components to enable data access to each of the storage cartridges to the SOC control circuit 522 and also to selectively control switches of a power control switch network 530 to selectively connect a power circuit 526 (e.g., enabling access to a select one of the storage drives 502, 504, 506, 508 at a time). The SOC 522 and the interface selection processor 524 each communicate with an external control circuit, such as a host, local server, rack controller, etc. via an interface connector 532.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   detecting a new coupling between a system controller and a storage drive;
   retrieving key information from the storage drive responsive to the detection, the key information being usable by the system controller to locate adaptives associated with a primary storage medium of the storage drive; and
   loading the adaptives into volatile memory to configure the system controller for access to the primary storage medium.

2. The method of claim 1, wherein the key information includes an identifier that uniquely identifies the storage drive.

3. The method of claim 1, wherein the adaptives are stored in a library external to the storage drive that is accessible to the system controller.

4. The method of claim 1, wherein the key information includes a first subset of the adaptives stored on a secondary storage medium included on the storage drive and the method further comprises using the first subset of the adaptives to configure read settings for reading a secondary subset of the adaptives from a location on the primary storage medium.

5. The method of claim 4, further comprising:
   configuring one or more read/write settings of the storage drive based on the first subset of the adaptives; and
   reading the second subset of the adaptives from the primary storage medium responsive to the configuration.

6. The method of claim 5, configuring one or more additional read/write settings of the storage drive based on the second subset of the adaptives; and
   executing host read/write operations according to the read/write settings configured based on the first subset of the adaptives and the read/write settings configured based on the second subset of the adaptives.

7. The method of claim 4, wherein the first subset of the adaptives includes at least variables sufficient to compute a transfer function between heater power level and a fly height.

8. The method of claim 1, wherein the key information is stored on a secondary storage medium.

9. The method of claim 8, wherein the secondary storage medium is at least one of a barcode, NFC tag, RFID tag, or flash chip.

10. A system comprising:
    a hardware controller removably coupled to a storage drive including a primary storage medium, the hardware controller configured to:
    retrieve key information from the storage drive responsive to detection of a coupling to the storage drive;
    use the key information to locate parameters associated with the primary storage medium; and
    load the parameters into volatile memory to configure read/write settings for access to the primary storage medium.

11. The system of claim 10, wherein the key information includes an identifier that uniquely identifies the storage drive, the parameters for the primary storage medium being stored in association with the identifier in a library external to the storage drive that is accessible to the hardware controller.

12. The system of claim 10, wherein the key information uniquely identifies the storage drive.

13. The system of claim 10, wherein parameters are drive-specific parameters and the key information includes a first subset of the parameters stored on a secondary storage medium, and wherein the hardware controller configures at least one controller setting according to the first subset of the parameters prior to reading a secondary subset of the parameters from the primary storage medium.

14. The system of claim 13, wherein the hardware controller configures one or more additional controller settings based on the second subset of the parameters.

15. The system of claim 13, wherein retrieving the first subset of the parameters includes at least retrieving variables utilized to compute a transfer function between heater power level and fly height.

16. The system of claim 10, wherein the hardware controller initiates a database query including the key information to retrieve the parameters for accessing the primary storage medium from a cloud-based server.

17. One or more memory devices storing processor-readable instructions for executing a computer process, the computer process comprising:
    detecting a coupling between a read/write controller and a storage drive including a primary storage medium; and
    reading adaptives for the primary storage medium from a first zone of the primary storage medium responsive to detection of the coupling, the adaptives being stored at a lower linear density than other data in the first zone.

18. The one or more memory devices of claim 17, wherein reading the adaptives further comprises reading the adaptives in a passive fly height mode.

19. The one or more memory devices of claim 17, wherein the adaptives are stored redundantly on multiple storage media within a storage drive.

20. The one or more memory devices of claim 17, wherein the primary storage medium is a disk and wherein the adaptives are read from a secure zone of a disk.

* * * * *